United States Patent Office 2,749,283
Patented June 5, 1956

2,749,283

HYDRO-DESULPHURISATION OF CRACKED PETROLEUM NAPHTHA AND STRAIGHT RUN NAPHTHA

Frederick William Bertram Porter, Sunbury-on-Thames, England, assignor to The British Petroleum Company Limited, a British joint-stock corporation No Drawing. Application November 21, 1952, Serial No. 321,950

Claims priority, application Great Britain December 7, 1951

3 Claims. (Cl. 196—28)

This invention relates to the hydrocatalytic desulphurisation of petroleum hydrocarbons.

In the specification of United States Patent No. 2,573,726, there is described a process for the hydrocatalytic desulphurisation of straight-run naphthas which is carried out under such conditions that the hydrogen required for the conversion of organically combined sulphur into hydrogen sulphide and for the maintenance of the necessary partial pressure of hydrogen in the reaction zone is obtained by dehydrogenation of naphthenes contained in the straight-run naphtha. Such a process may conveniently be called an autofining process.

Cracked naphthas obtained by the thermal or catalytic cracking of higher boiling petroleum distillates, such as gas oils and wax distillates, have a high sulphur content and poor stability. In the case of lighter naphthas (FBP 200° C. ASTM), autofining results in partial desulphurisation and some improvement in stability but this is not sufficient to provide a satisfactory merchantable product. Furthermore, there is a rapid decrease in the desulphurising activity of the catalyst with the result that the on-stream period is very short. This difficulty has been overcome with respect to higher boiling napthas (200–270° C. ASTM) by treating them in blend with kerosine and straight-run naphthas.

The principal object of the present invention is to provide a process by means of which cracked naphthas having a final boiling point of up to 200° C. ASTM can be desulphurised sufficiently to provide a merchantable product.

According to the invention, a cracked naphtha boiling in the gasoline boiling range is mixed with a straight-run naphtha of substantially the same boiling range in such proportions that on passing the mixture over a sulphur-resistance dehydrogenation-hydrogenation catalyst under controlled conditions of temperature and pressure, an amount of hydrogen is obtained by dehydrogenation of naphthenes contained in the mixture not substantially in excess of that required to convert organically combined sulphur contained in the mixture into hydrogen sulphide and to maintain a circulation of hydrogen sufficient to keep the mixture in the vapour phase without the need for hydrogen from an extraneous source.

The preferred catalyst is of the so-called cobalt molybdate type which comprises mixtures of the oxides of cobalt and molybdenum, or chemical compounds of cobalt, molybdenum and oxygen, or mixtures of one or both of said oxides with said compound either alone or incorporated with a support. A particularly preferred catalyst consists of the combined oxides of cobalt and molybdenum distended upon alumina.

The ratio in which the cracked naphtha is blended with the straight-run naphtha should be chosen after consideration of the inspection data on the feedstock, the higher the sulphur content of the cracked naphtha the greater being the proportion of straight-run naphtha required.

The process conditions should be selected to provide adequate desulphurisation and storage stability and also to minimise any loss in octane number of the cracked naphtha. Within these limits, the process conditions may vary over a wide range but it has been found that the process is particularly satisfactory under the following conditions.

1. Pressures below 150 p. s. i. g. a.
2. Space velocities of 0.5–3.0 v./v./hr. of liquid feedstock dependent upon the sulphur content.
3. Temperatures in the range 750–830° F.

The rate at which hydrogen-containing gas is recycled to the reaction zone may be varied, low rates tending to shorten the on-stream hours although adequate desulphurisation can be obtained over a shorter period.

In order to provide a product of satisfactory colour, it may be necessary to remove a small quantity, up to 2%, of the high boiling components of the product and this may be done by redistillation of the product. Redistillation may be avoided, however, by subjecting the products from the reaction zone to a partial cooling whereby sufficient of the high boiling components are condensed and removed before the treated products are finally liquified. The method of effecting this partial condensation is described in the specification of the co-pending United States application No. 217,598.

The storage stability of the treated products may be further increased by the addition of a gum inhibitor.

The low sulphur content of the treated product results in good lead response.

The invention will now be described with reference to the following examples.

EXAMPLE 1

A blend of equal proportions of visbreaker pressure distillate and straight-run naphtha obtained from Iranian crude was passed over a catalyst consisting of the combined oxides of cobalt and molybdenum distended on alumina at a space velocity of 1.0 v./v./hr. of liquid feedstock, at a temperature of 780° F. and a pressure of 100 p. s. i. g. a.

Gas separated from the treated product was recycled to the reaction zone at the rate of 4000 s. c. f./B and the process was continued for 100 hours. The properties of the components of the feedstock, the blended feedstock and the product are set out in the following table, No. 1.

*Table 1*

| Material | Straight run naphtha | Visbreaker Pressure Distillate | 50% vol. Blend | Refined Product rerun to 2% Bottoms |
|---|---|---|---|---|
| Specific Gravity @ 60° F./60° F. | 0.70 | 0.75 | 0.725 | 0.71 |
| Distillation: | | | | |
| I. B. P. _____ ° C___ | 27 | 53 | 40 | 40 |
| 5% vol. @ _____ ° C___ | 40 | 70 | 47 | 45 |
| 50% vol. @ _____ ° C___ | 93.5 | 143.5 | 106 | 102 |
| 90% vol. @ _____ ° C___ | 131.5 | 195 | 149 | 159 |
| F. B. P. _____ ° C___ | 148.5 | 209 | 204 | 190 |
| Colour Saybolt_____ | | −5 | | +27 |
| Bromine No._____ | <1 | 61 | | 20 |
| Gum existent, mg./100 ml_____ | | 10 | | 1 |
| Gum (E+P), mg./100 ml_____ | | 75 | | 1 |
| ASTM Induction Period, min_ | | | | >720 |
| Sulphur content, percent wt___ | 0.08 | 0.548 | 0.32 | 0.07 |
| Sulphur removal, percent_____ | | | | ca. 70 |
| Octane Number Research_____ | 59 | 58.6 | 59 | 65 |

EXAMPLE 2

A blend of equal proportions of catalytically cracked naphtha and straight-run naphtha obtained from Iranian crude was passed over a catalyst consisting of the combined oxides of cobalt and molybdenum distended on alumina at a space velocity of 1.0 v./v./hr. of liquid feedstock and at a temperature of 780° F. and a pressure of 100 p. s. i. g. a.

Gas separated from the treated product was recycled to the reaction zone at the rate of 4000 s. c. f./B and the process was continued for 100 hours. The properties of the components of the feedstock, the blended feedstock and the product are set out in the following table, No. 2.

*Table 2*

| Material | Straight run Naphtha | Catalytic Cracker Naphtha | 50% vol. blend | Refined and rerun 2% vol. bottoms |
|---|---|---|---|---|
| Specific Gravity @ 60° F./60° F. | 0.70 | 0.76 | 0.73 | 0.71 |
| Distillation: | | | | |
| I. B. P. _____ ° C____ | 27 | 40 | 33 | 29 |
| 5% vol. @ _____ ° C____ | 40 | 52 | 45 | 40 |
| 50% vol. @ _____ ° C____ | 93.5 | 104 | 96 | 95 |
| 90% vol. @ _____ ° C____ | 131.5 | 196.5 | 150 | 155 |
| F. B. P. _____ ° C____ | 148.5 | 218.5 | 208 | 195 |
| Colour Saybolt | | | | +26 |
| Bromine Number | <1 | 99 | 50 | 22 |
| Gum Existent, mg./100 ml | | 229 | | Trace |
| Gum (E+P), mg./100 ml | | 449 | | 8 |
| ASTM Induction Period, min. | | 138 | | 700 |
| Sulphur content, percent wt. | 0.08 | 0.22 | 0.15 | 0.04 |
| Sulphur removal, percent wt. | | | | ca. 70 |
| Octane Number M. M. | 60 | 79 | 70 | 68 |

I claim:

1. A process for the hydrocatalytic desulphurization of cracked naphthas having a final boiling point of up to 200° C. ASTM which comprises mixing a cracked naphtha high in naphthene content and boiling in the gasoline boiling range with a determined proportion of straight-run naphtha of substantially the same boiling range; passing the mixture at a space velocity of 0.5 to 3.0 v./v./hr. of liquid feedstock to a reaction zone and contacting the mixture therein with a sulphur-resistant dehydrogenation-hydrogenation catalyst at a temperature within the range 750–830° F., and at a superatmospheric pressure not exceeding 150 p. s. i. g. a., said temperature and pressure being correlated to produce an amount of hydrogen by dehydrogenation of naphthenes contained in the mixture not substantially in excess of that required to convert organically combined sulphur contained in the mixture into hydrogen sulphide and to maintain a circulation of hydrogen sufficient to keep the mixture in the vapor phase without the need for hydrogen from an extraneous source, and said straight-run naphtha being present in said mixture in an amount to satisfy the naphthene requirements for the production of said amount of hydrogen under said controlled conditions of temperature and pressure; separating a hydrogen-rich gas from the treated mixture; recycling said hydrogen-rich gas to said reaction zone; and, recovering a treated mixture of reduced sulphur content as the desired product.

2. A process according to claim 1, wherein the catalyst is selected from the group consisting of mixtures of the oxides of cobalt and molybdenum, chemical compounds of cobalt, molybdenum and oxygen, and mixtures of at least one of said oxides with said compounds.

3. A process according to claim 1, wherein the catalyst consists of the oxides of cobalt and molybdenum distended upon alumina.

References Cited in the file of this patent

UNITED STATES PATENTS

| 2,253,308 | Rosen | Aug. 19, 1941 |
| 2,547,380 | Fleck | Apr. 3, 1951 |
| 2,606,141 | Meyer | Aug. 5, 1952 |